(12) United States Patent
Rahman et al.

(10) Patent No.: US 10,965,473 B2
(45) Date of Patent: *Mar. 30, 2021

(54) SMART OBJECT IDENTIFICATION IN THE DIGITAL HOME

(71) Applicant: Convida Wireless, LLC, Wilmington, DE (US)

(72) Inventors: Shamim Akbar Rahman, Cote St. Luc (CA); Dale N. Seed, Allentown, PA (US); Lijun Dong, San Diego, CA (US); Chonggang Wang, Princeton, NJ (US); Quang Ly, North Wales, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/360,130

(22) Filed: Mar. 21, 2019

(65) Prior Publication Data

US 2019/0222426 A1 Jul. 18, 2019

Related U.S. Application Data

(63) Continuation of application No. 14/914,011, filed as application No. PCT/US2014/053456 on Aug. 29, 2014, now Pat. No. 10,256,892.

(60) Provisional application No. 61/872,252, filed on Aug. 30, 2013.

(51) Int. Cl.
*H04L 9/32* (2006.01)
*H04L 12/28* (2006.01)
*H04L 29/06* (2006.01)
*H04W 4/70* (2018.01)
(Continued)

(52) U.S. Cl.
CPC ........ *H04L 9/3268* (2013.01); *H04L 12/2809* (2013.01); *H04L 63/0823* (2013.01); *H04W 4/70* (2018.02); *H04W 12/003* (2019.01); *H04W 12/04* (2013.01); *H04W 12/00503* (2019.01)

(58) Field of Classification Search
CPC ....... H04L 67/10; H04L 67/16; H04L 67/306; H04W 4/005
See application file for complete search history.

(56) References Cited

U.S. PATENT DOCUMENTS

| | | | |
|---|---|---|---|
| 2002/0047546 A1* | 4/2002 | Kayser | H05B 47/20 315/117 |
| 2005/0138192 A1 | 6/2005 | Encarnacion et al. | |
| 2006/0174323 A1 | 8/2006 | Brown et al. | |

(Continued)

OTHER PUBLICATIONS

Lee et al., Home Network Device Authentication: Device Authentication Framework and Device Certificate Profile, 2007, Springer-Verlag Berlin Heidelberg, 10 pages (Year: 2007).*

(Continued)

*Primary Examiner* — Christopher C Harris
(74) *Attorney, Agent, or Firm* — BakerHostetler

(57) ABSTRACT

Methods, systems, and devices may be used for assigning names and bootstrapping of security credentials for Smart Objects inside a Digital Home environment. Methods, systems, and devices for identification and security bootstrapping of a smart object within a digital home environment may include automated assignment of a device level ID and security credential for each smart object in the home using a resource directory.

20 Claims, 13 Drawing Sheets

(51) Int. Cl.
*H04W 12/00* (2021.01)
*H04W 12/04* (2021.01)

(56) References Cited

U.S. PATENT DOCUMENTS

| | | | |
|---|---|---|---|
| 2009/0047950 A1* | 2/2009 | Doppler | H04W 48/14 455/435.1 |
| 2012/0198037 A1 | 8/2012 | Shelby et al. | |
| 2013/0166755 A1 | 6/2013 | Sasin et al. | |
| 2013/0211546 A1 | 8/2013 | Lawson et al. | |
| 2014/0359131 A1 | 12/2014 | Seed et al. | |
| 2015/0052231 A1 | 2/2015 | Sun et al. | |

OTHER PUBLICATIONS

Wikipedia, SHA-2, 11 pages, https://en.wikiPedia.org/wiki/SHA-2.
Shelby, "CoRE Resource Directory", Internet Engineering Task Force, (IETF), Jun. 3, 2013, 1-27.
Shelby, "Constrained RESTful Environments (CoRE)Link Format", rfc 6690, Internet Engineering Task Force, (IETF), Aug. 7, 2012, 1-22.
Shelby et al, CoRE Resource Directory, Feb. 25, 2013, IETF, 27 Pages.
Shelby et al, "Constrained Application Protocol (CoAP) drafl-ietf-core-coap-17", CoRE Working Group, May 26, 2013, 119 pages.
Roman et al, "Internet Article Computer Networks", Jul. 1, 2013, 2266-2279.
International Application No. PCT/US2014/053456: International Search Report and the Written Opinion dated Dec. 18, 2014, 11 pages.
CoRE Resource Directory, https://www.ietf.org/id/draft-ietf-core-resource-directory-00, Jun. 2013, 27 pages.

\* cited by examiner

SMART OBJECT IDENTIFICATION IN THE DIGITAL HOME

CROSS-REFERENCE TO RELATED APPLICATIONS

This application is a continuation application of U.S. patent application Ser. No. 14/914,011 filed Feb. 24, 2016 which is a National Stage Application filed under 35 U.S.C. 371 of International Application No. PCT/US2014/053456, filed Aug. 29, 2014, which claims the benefit of U.S. Provisional Patent Application No. 61/872,252 filed on Aug. 30, 2013, entitled "SMART OBJECT IDENTIFICATION IN THE DIGITAL HOME," the contents of U.S. patent application Ser. No. 14/914,011, PCT/US2014/053456 and Application No. 61/872,252 are hereby incorporated by reference herein.

BACKGROUND

Machine-to-Machine (M2M) technologies have enabled various applications in different areas, such as system status monitoring, automatic energy metering, home automation, wireless monitoring in intelligent buildings, personal area networks, monitoring of parameters, positioning, and real time location in medical technology, among other things.

Machine-to-Machine (M2M) communication is a form of data communication between entities that, when deployed, do not necessarily require direct human interaction. One challenge of M2M communication is establishing a protocol so that that deployed equipment may be managed efficiently.

SUMMARY

Disclosed herein are methods, systems, and devices for assigning names and bootstrapping of security credentials for machine-to-machine devices inside a machine-to-machine communication network. In an example, a method may include automatically registering a machine-to-machine device with a resource directory, and responsive to registering with the resource directory, requesting an identity assignment for the machine-to-machine device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EXAMPLES

Figure 1:
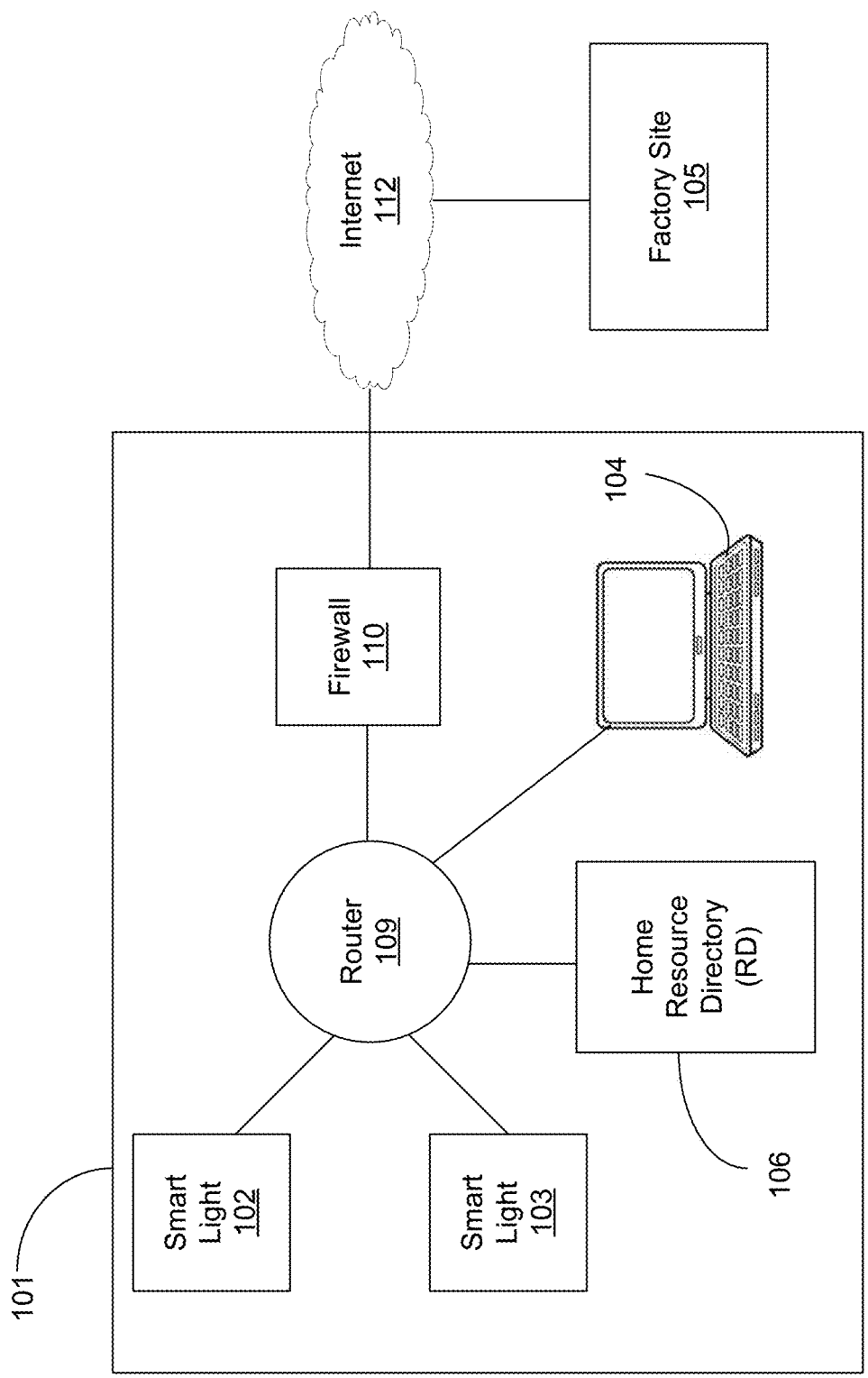
FIG. 1 illustrates a digital home architecture.

Devices at a site may be connected with each other and able to exchange data and control information. A digital site may be a home, business, or other facility or subset of the facility that has a communication network (e.g., a network of machine-to-machine devices). For example, a digital site that may encompass a consumer's home (hereinafter "digital home") may have (e.g., appliances) that are communicatively connected to exchange data and control information. A smart object may also be referred to as a M2M device or an Internet of Things (IoT) device. Smart objects may include devices that normally have minimal memory and processing power. Some examples of smart objects include lights, thermostats, toasters, security systems, and garage door openers, among other things. It is contemplated herein that a smart object has the hardware and software to support the digital site functionality, such as naming and security, discussed herein. In an example, a light bulb may have a chip integrated into it. Other examples, with regard to lighting may include a device attached or integrated into a light bulb socket, lamp body, electrical socket for the light, or the like. Herein the term "digital home" will be used, but a person having ordinary skill should understand that the disclosed concepts are applicable to facilities other than homes, such as stores, factories, office buildings, etc. A "digital home" may be referred to as a "connected home," or "smart home," or among other things, that indicate devices in the home are connected by Internet protocols to the IoT.

Conventional approaches for assigning an identity (and associated security credentials) to a device are not geared towards addressing the general issue of "naming" with regard to the digital home. Today a user may manually assign a name to a WiFi router and then manually enter the associated pre-shared key (password) into the devices that wish to access the WiFi router. With IoT there is expected to be many devices in the digital home, such that this conventional manual approach may not scale well in the digital home. Also, it may not work well or work at all for smart objects that have no direct user interface (e.g., touch screen or keyboard) for the user to enter names and pre-shared keys.

Disclosed herein are method, devices, and systems for allowing a user (e.g., homeowner) to assign an identity to each of the expected large number and wide variety of smart objects in a digital site, which may be associated with the Internet of Things (IoT). The assigned identity may be intended as a lasting or permanent identity that may persist in a non-volatile storage. An identity (and associated security credentials) may allow a user to efficiently identify, query, and control how a smart object participates in a site network over its lifetime. Other site-level deployments (office building, factory, coffee shop) may have an implementation that is similar to the digital home discussed herein.

The systems, devices, and methods may be implemented by adding a naming control and security bootstrapping functionality to the Internet Engineering Task Force (IETF) defined Resource Directory (RD) and constrained application protocol (CoAP) to perform tasks such as the following: 1) Pre-configure a home RD for assignments of smart object identity and security credentials within the digital home; 2) At power on (which may be the first power on by a consumer), each smart object in the digital home automatically registering with the home RD to request identity assignment; 3) The home RD checking with the user (or his/her automated naming software proxy) to decide if the smart object will be named and accepted into the digital home network; 4) The assigned identity being used as the common name for required purposes for the smart object within the digital home; or 5) The assigned security credentials being used as the input for security purposes for the smart object within the digital home (i.e., bootstrapping of security credentials). As an alternative to or an addition to CoAP, the disclosed methods may be implemented with Hypertext Transfer Protocol (HTTP), MQTT, or the like protocol that has representational state transfer (REST) architecture.

The disclosed applies to any other site-level deployment with similar characteristics to a digital home (e.g. office building, factory, etc.). Generally, similar sites have many smart objects (e.g. industrial machinery, temperature sensors, or security sensors) connected by an internal IP network and with a significant amount of device-to-device communication. Also, these sites may be connected to the rest of the Internet, but the connection may be strictly controlled via a firewall and dedicated Internet service provider (ISP) interface.

FIG. 1 illustrates a digital home architecture. In FIG. 1, the smart objects shown are smart light 102 and smart light 103. There may be many other typical smart objects in a home such as stoves, heaters, etc., but these are omitted for clarity. A device like a smart phone may be part of the digital home when it is inside the home. Smart light 102 and smart light 103 may be connected via wired (e.g. Ethernet) or wireless (e.g. WiFi) links and connected via an IP router 109. A feature in the digital home network is that it may be connected to the rest of the Internet 112 via an ISP interface (e.g. fiber optic interface). In this example, a firewall 110 exists that will strictly control communication between digital home 101 and the rest of the Internet 112. There is digital factory 105 that may also have smart objects. The digital factory 105 and digital home 101 may be private networks that are connected with Internet 112, but not communicatively connected with each other.

As shown in FIG. 1, inside digital home 101 there is home RD 106 that acts as a database and contains configuration and control information for smart objects (e.g., smart light 102 and smart light 103) in digital home 101. The concept of the RD database was introduced in the IETF to help facilitate deployments of Internet of Things (IoT). FIG. 1 also shows laptop 104 that may have an associated web browser interface that allows a user to control and manage the entire digital home 101.

Figure 2:
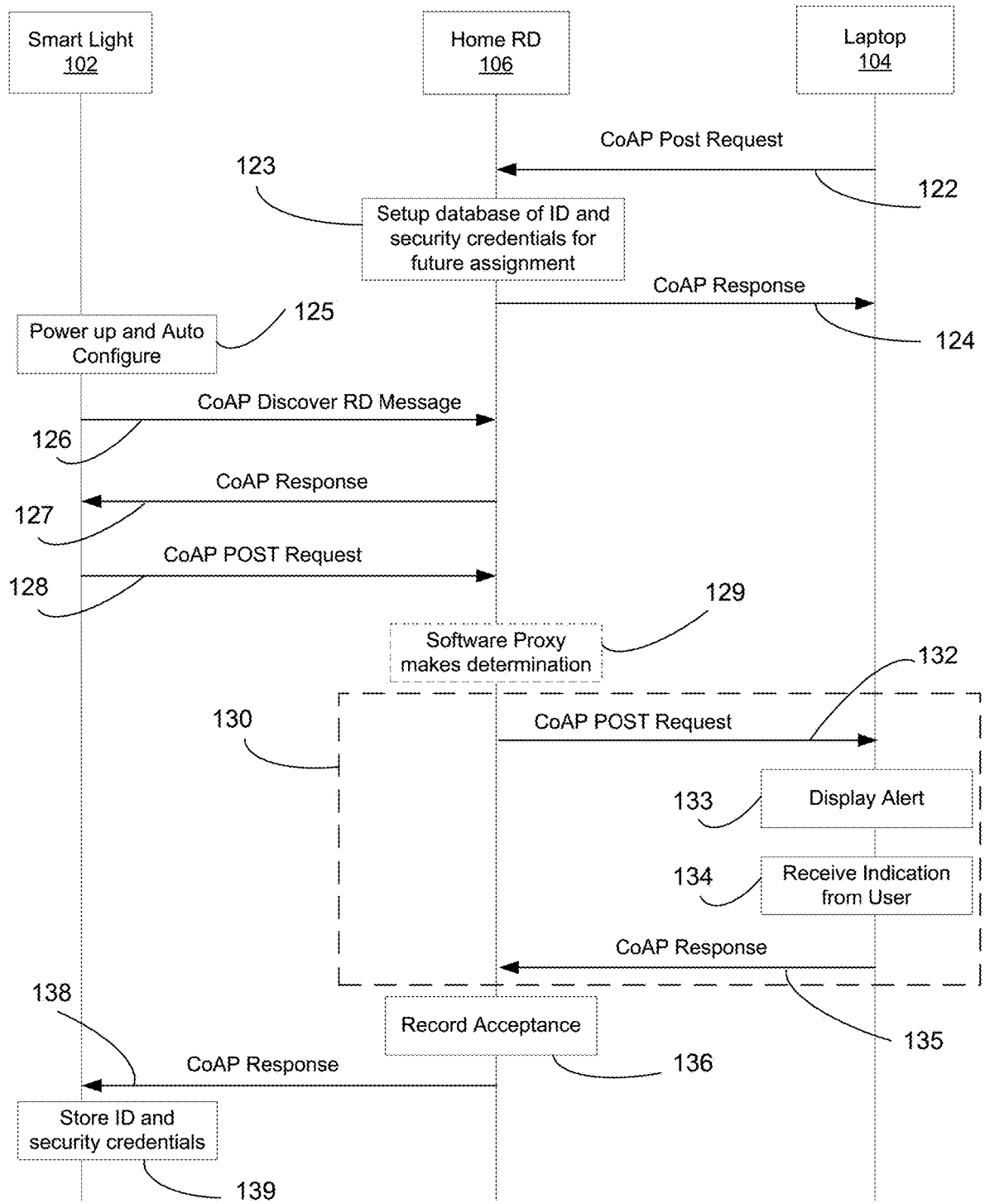
FIG. 2 illustrates an example flow for configuring a machine-to-machine device and resource directory (RD) for identities and security credentials.
Figure 5:
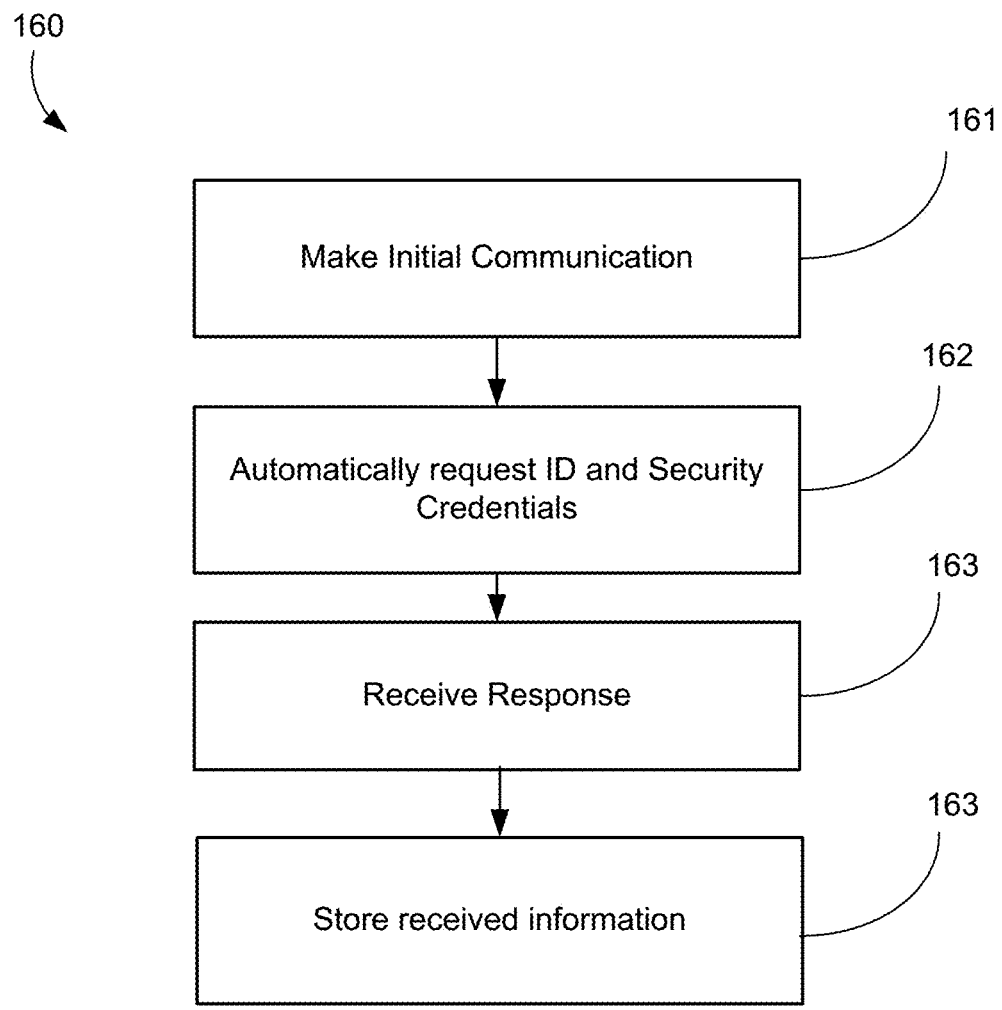
FIG. 5 illustrates an exemplary method for retrieving an identity and security credentials for a machine-to-machine device.
Figure 10A:
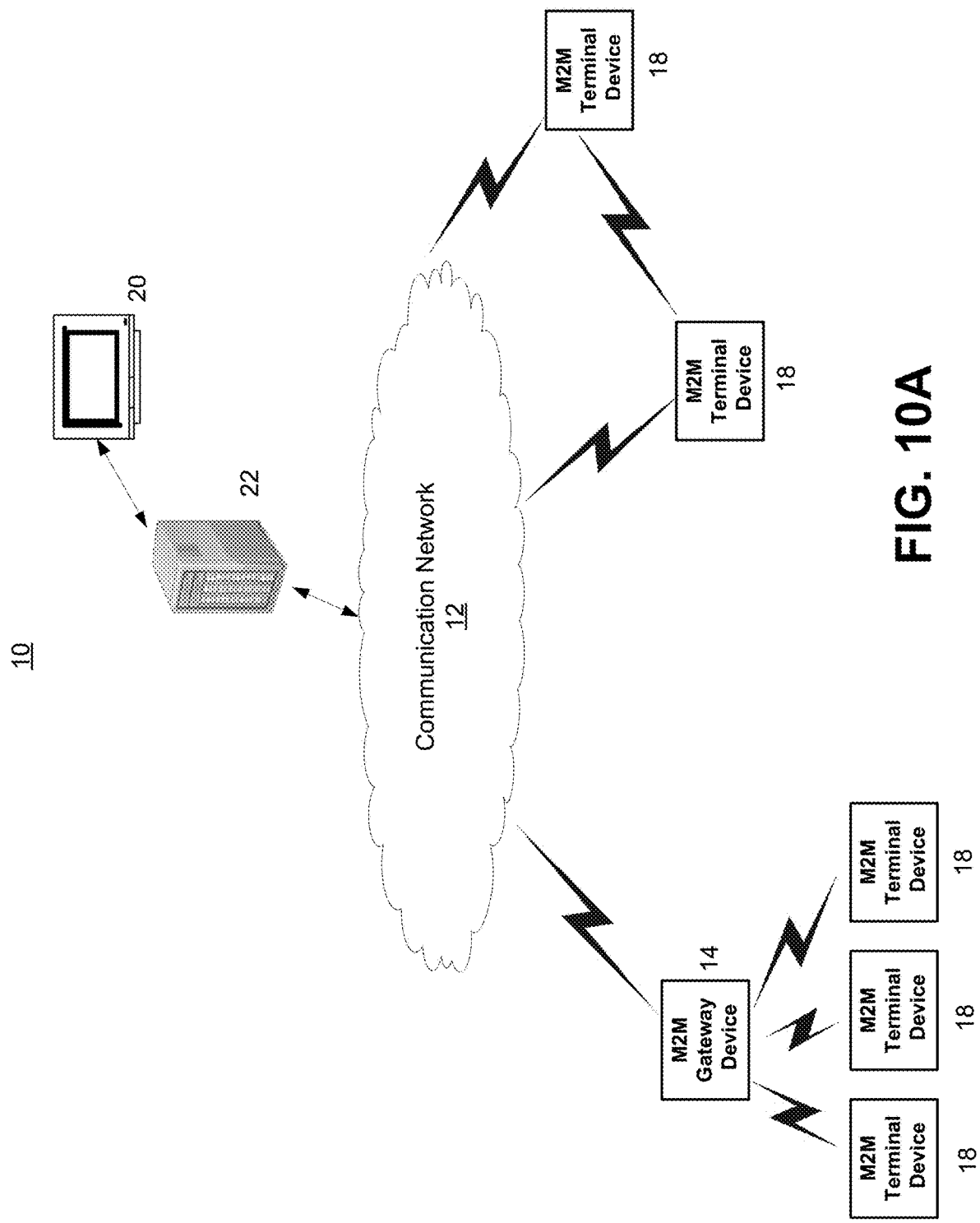
FIG. 10A is a system diagram of an example machine-to-machine (M2M) or Internet of Things (IoT) communication system in which one or more disclosed examples may be implemented.
Figure 10B:
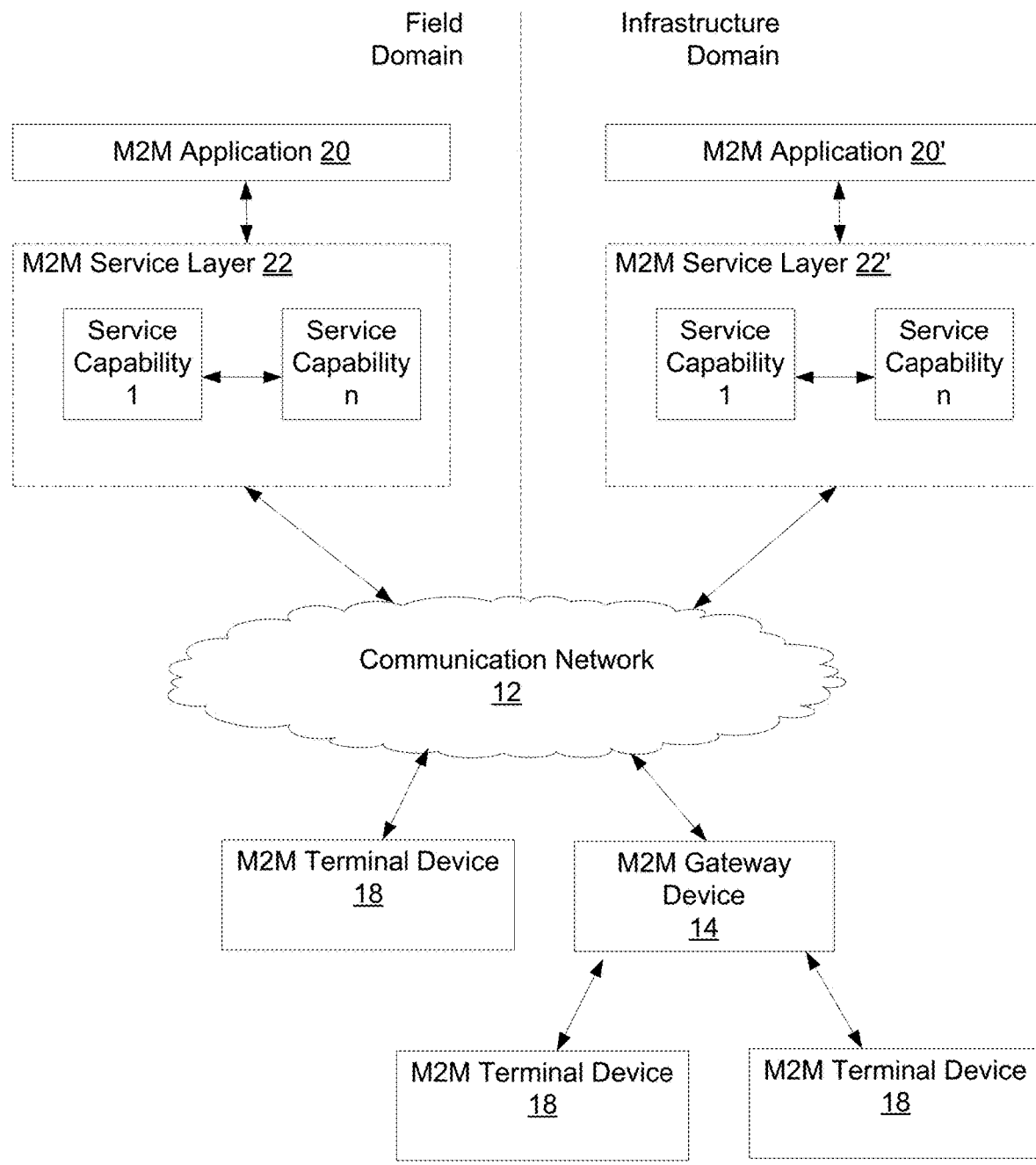
FIG. 10B is a system diagram of an example architecture that may be used within the M2M/IoT communications system illustrated in FIG. 10A.
Figure 10C:
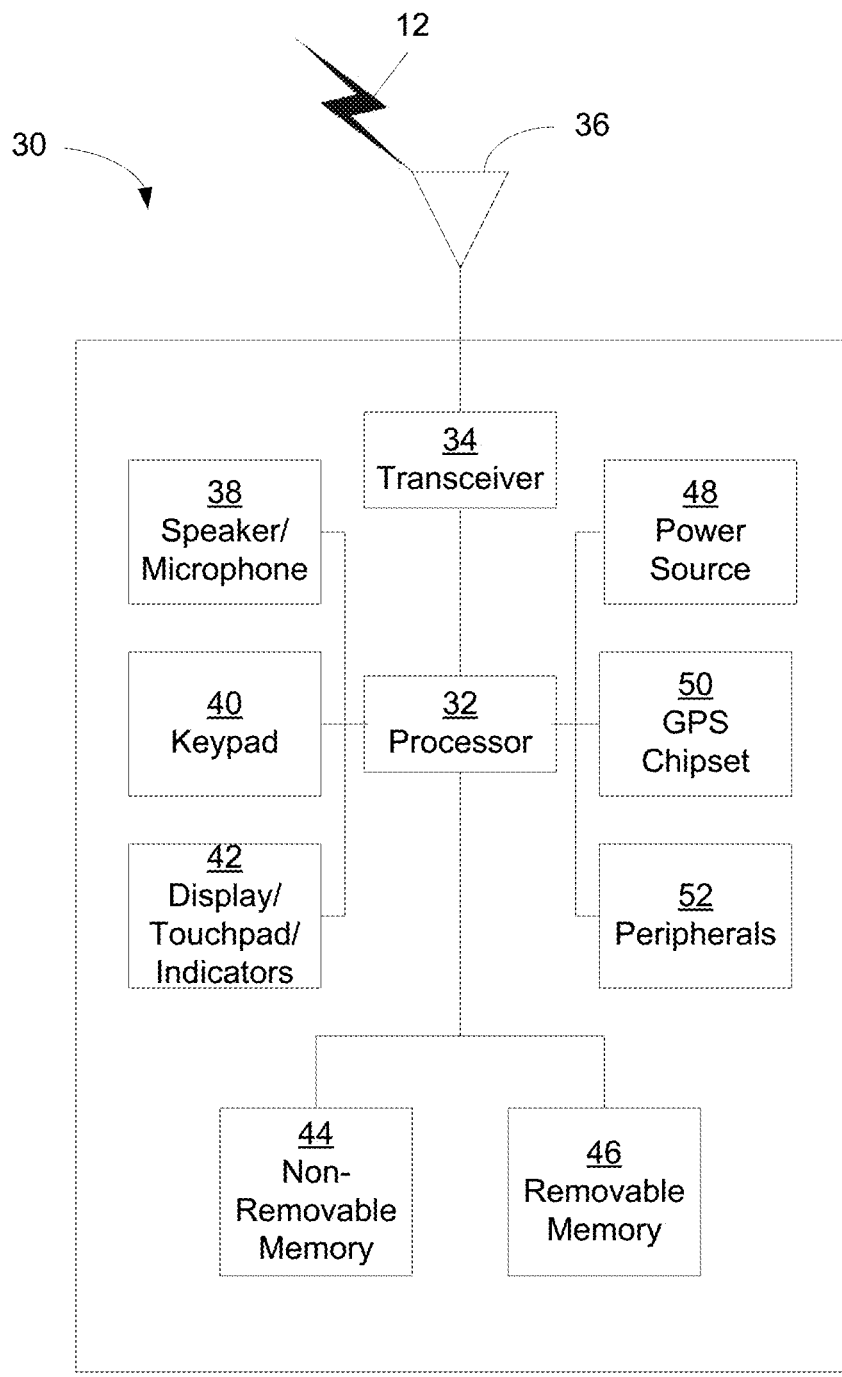
FIG. 10C is a system diagram of an example M2M/IoT terminal or gateway device that may be used within the communications system illustrated in FIG. 10A.
Figure 10D:
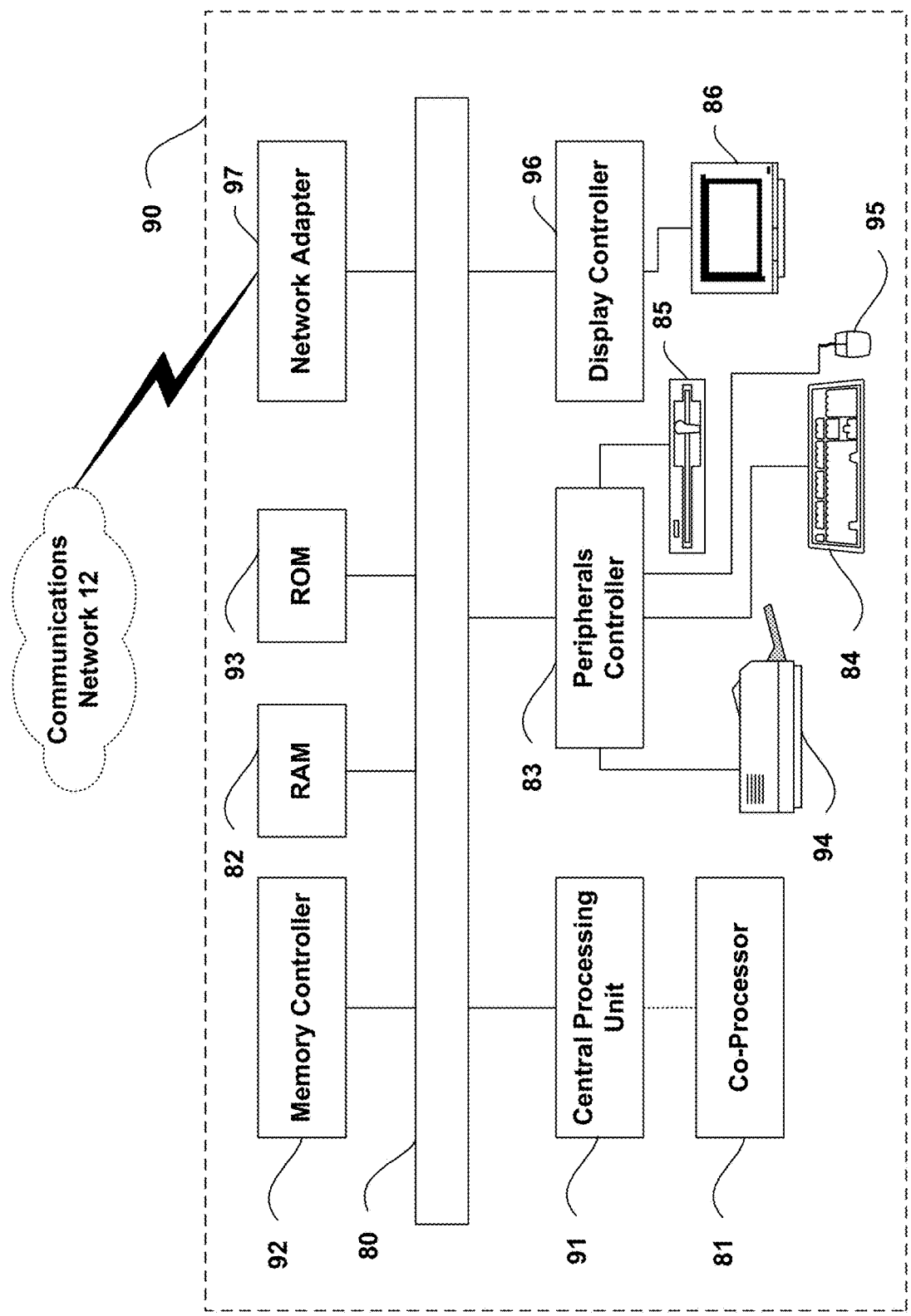
FIG. 10D is a block diagram of an example computing system in which aspects of the communication system of FIG. 10A may be embodied.

It is understood that the entities performing the steps illustrated in FIG. 2 and FIG. 5 are logical entities that may be implemented in the form of software (i.e., computer-executable instructions) stored in a memory of, and executing on a processor of, a device, server, or computer system such as those illustrated in FIG. 10C or FIG. 10D. That is, the method(s) illustrated in FIG. 2 and FIG. 5 may be implemented in the form of software (i.e., computer-executable instructions) stored in a memory of a computing device, such as the device or computer system illustrated in FIG. 10C or FIG. 10D, which computer executable instructions, when executed by a processor of the computing device, perform the steps illustrated in FIG. 2 and FIG. 5.

FIG. 2 illustrates exemplary steps for a user (e.g., homeowner) to pre-configure the home RD for assignments of {Identity, Security Credentials} for smart objects. The configuration may be done via a secure interface between the home RD and the user interface (e.g., laptop). The configuration info may be securely downloaded from the user interface (laptop) to the home RD via a secure CoAP link (i.e., "coaps"). Also other secure approaches like "https" may be used on this interface, as it is not necessarily resource-constrained.

At step 122 of FIG. 2, laptop 104 may send a CoAP POST request to home RD 106. The request of step 122 may include information for assigning an identity and security credentials to a smart object (e.g., smart light 102). The request of step 122 may be sent over a secure ("coaps") tunnel between home RD 106 and laptop 104. In an example, an assumption may be that home RD 106 within digital home 101 is trustworthy and that laptop 104 may safely establish the "coaps" link to it. Therefore, digital security certificate of home RD 106 (with public encryption key) may be implicitly trusted. As a result, messages between home RD 106 and laptop 104 may be encrypted or decrypted using a one-time session key (exchanged securely using the public key of home RD 106, which had been sent as part of the RD's security certificate). The scope of the identity and the security credentials allows for easily recognizable naming for a site like digital home 101, but the identity and security credentials may be extended for use on the Internet.

At step 123, based on the information given in step 122, home RD 106 may create a database of {identity, security credentials} for future assignment to a smart object, such as smart light 102. At step 124, home RD 106 may send a CoAP response that acknowledges the acceptance of the information received in step 122 that may be saved in the database. In an example, the identity and security credentials may be sent before smart light 102 or any other smart object is installed or otherwise connected, if a user anticipates a particular identity for an anticipated smart object. The prepopulated identity (i.e., name) may be "bedroom light," "toaster," "refrigerator," or the like. Each identity may be used to identify a physical smart object (i.e., device level identity and not an interface, flow, or session identifier). The configuration with regard to steps 122-124 may include specifying structure of the identity, pre-shared key values for the security credentials, etc. The configuration may be done in a bulk manner. Therefore, a user may configure a block of identities and security credentials for the smart objects in digital home 101.

At step 125, smart light 102 may power up and auto configure. The power up may be for the first time in digital home 101. Smart light 102 may have a factory set media access control (MAC) address. At step 125, smart light 102 may perform techniques such as IPv6 stateless address auto-configuration to get its dynamic (and temporary) IPv6 address. Or if smart light 102 is part of a mesh network then it may use mesh networks specific techniques to get an IP address assigned.

At step 126, smart light 102 sends a CoAP message in order to discover the local home RD (e.g., home RD 106). The CoAP message of step 126 may be a broadcast or multicast message. The multicast may be either link-level or site-level multicast to make sure that the discovery is done substantially within digital home 101 and does not extend out to the general Internet 110. The IP multicast request may be used so that although all devices may receive the request, only the home RD will reply. At step 127, home RD 106 sends a response to smart light 102. The response of step 127 may include information identifying home RD 106, that includes its security certificate so that in future steps smart light 102 may utilize this information for things such as setup of a secure (coaps) request to home RD 106.

At step 128, smart light 102 sends a CoAP message to home RD 106 that may request a permanent identity (ID) and request to register with home RD 106. The message of step 128 may also include information about smart light 102, such as a MAC address and device type information that identifies smart light 102 (e.g., light bulb, lamp, or overhead lamp). Also location information may be sent at step 128, such as a GPS coordinates, room location (e.g., "living room"), or the like. The message of step 128 may be sent over a secure ("coaps") tunnel between home RD 106 and smart light 102. After step 128, there are multiple options for what may occur next. FIG. 2 illustrates a first option that includes step 129, as well as a second option that involve the steps within block 130. With regard to the first option, at step 129, a software proxy on home RD 106 may determine whether to accept or reject the request of step 128. The software proxy of home RD 106 may automatically determine whether to accept or reject the request and automatically determine the name of smart light 102. The name of smart light 102 may be based on a number of criteria, such as the location of the smart object (e.g., bedroom or bathroom), the type of smart object (e.g., light bulb or toaster oven), or the number of similar smart objects at a location.

With continued reference to FIG. 2, the steps within block 130 refer to a second option where home RD 106 will check with a user to determine whether to accept or reject smart light 102 in digital home 101. At step 132, home RD 106 may forward the request of step 128 to laptop 104. At step 133, laptop 104 may display via a user interface (e.g., graphical user interface—web browser) an alert that requests a user to accept or deny smart light 102. The alert may be simple text or a graphic, such as a map showing the location of smart light 102 in digital home 101 as well as identifying information such as a MAC address, IP address, or previously assigned name (when applicable). At step 134, laptop 104 may receive an indication from a user (e.g., a mouse click or key press) communicated via a (CoAP or HTTP) web browser interface that the user accepts (or rejects) smart light 102. In addition, a user may select an identity (name) for smart light 102. The selection may be based on already inputted identity (e.g., steps 122-124) or may be input after receiving the accept request of step 132. At step 135, laptop 104 sends a CoAP response message to home RD 106 that includes an indication that smart light 102 is accepted or rejected or an indication of an identity for smart light 102.

With continued reference to FIG. 2, at step 136, home RD 106 records the acceptance (or rejection) of step 135. In addition, home RD 106 assigns a permanent identity and security credential for smart light 102, if accepted. At step 138, home RD 106 sends a CoAP response message to smart light 102, which may include an identity for smart light 102, security credentials for smart light 102, or an acknowledgement of acceptance of smart light 102 by home RD 106 or laptop 104. At step 139, smart light 102 may store the security credentials and the permanent identity in its non-volatile memory.

Figure 3:
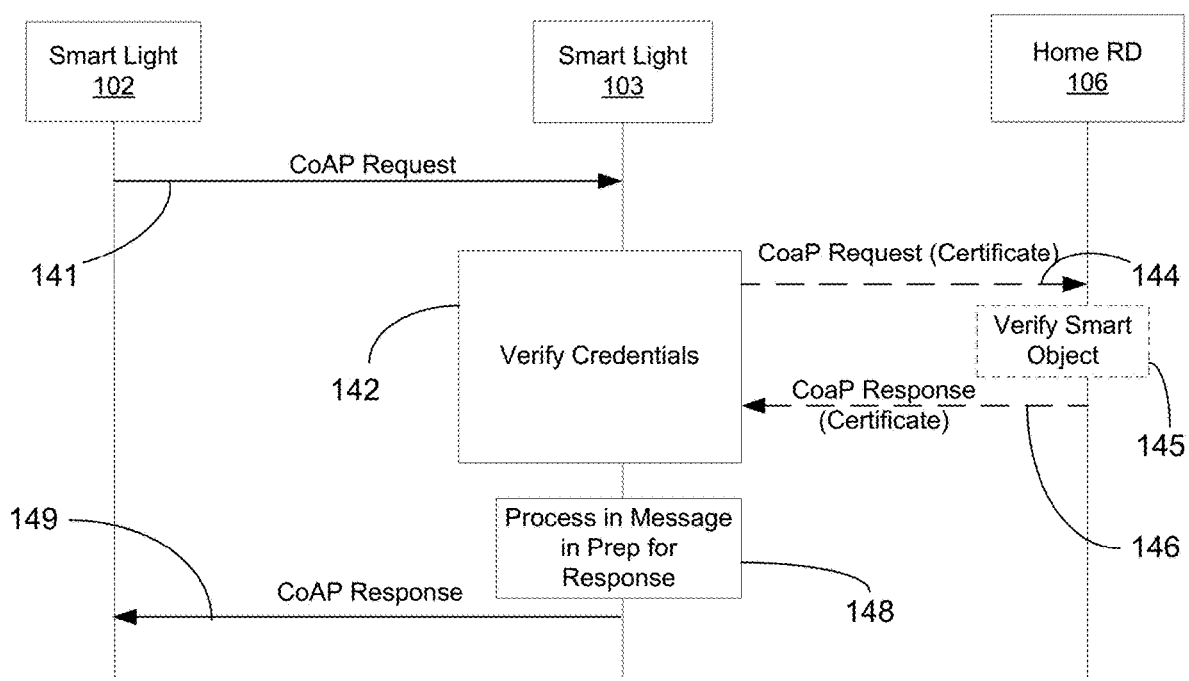
FIG. 3 illustrates an example flow for operation of a digital home after a successful naming.

FIG. 3 illustrates an exemplary method after successful naming (i.e., assigning an identity) of a smart light. In FIG. 3, at step 141, smart light 102 sends its successfully assigned identity and security credential (e.g., digital security certificate) as part of a CoAP message to another device (e.g., smart light 103) in digital home network 101. The request could be for smart light 103 to change its color or intensity to coordinate with smart light 102. At step 142, smart light 103 may verify the security credentials or ID of smart light 102. In an example, at step 142, smart light 103 may decrypt the message of step 141 with a pre-shared key in order to verify the security credentials and ID. In another example, if a certificate was received at step 141, then step 144 through step 146 may be executed. At step 144, smart light 103 may send a message to home RD 106 that requests verification of a certificate received by smart light 103. At step 145, home RD 106 may verify if smart light 102 has a registered certificate. Assuming here that smart light 102 has a registered certificate, at step 146, home RD 106 may send a message to smart light 103 verifying the certificate of smart light 102. At step 148, based on the positive verification of step 146, smart light 103 may further process the CoAP message of step 141. The message of step 141 may be a CoAP request of any type. At step 149, smart light 103 sends a CoAP response to smart light 102, which may be a successfully processed result (e.g., successfully dimming light to coordinate with smart light 102).

Figure 4:
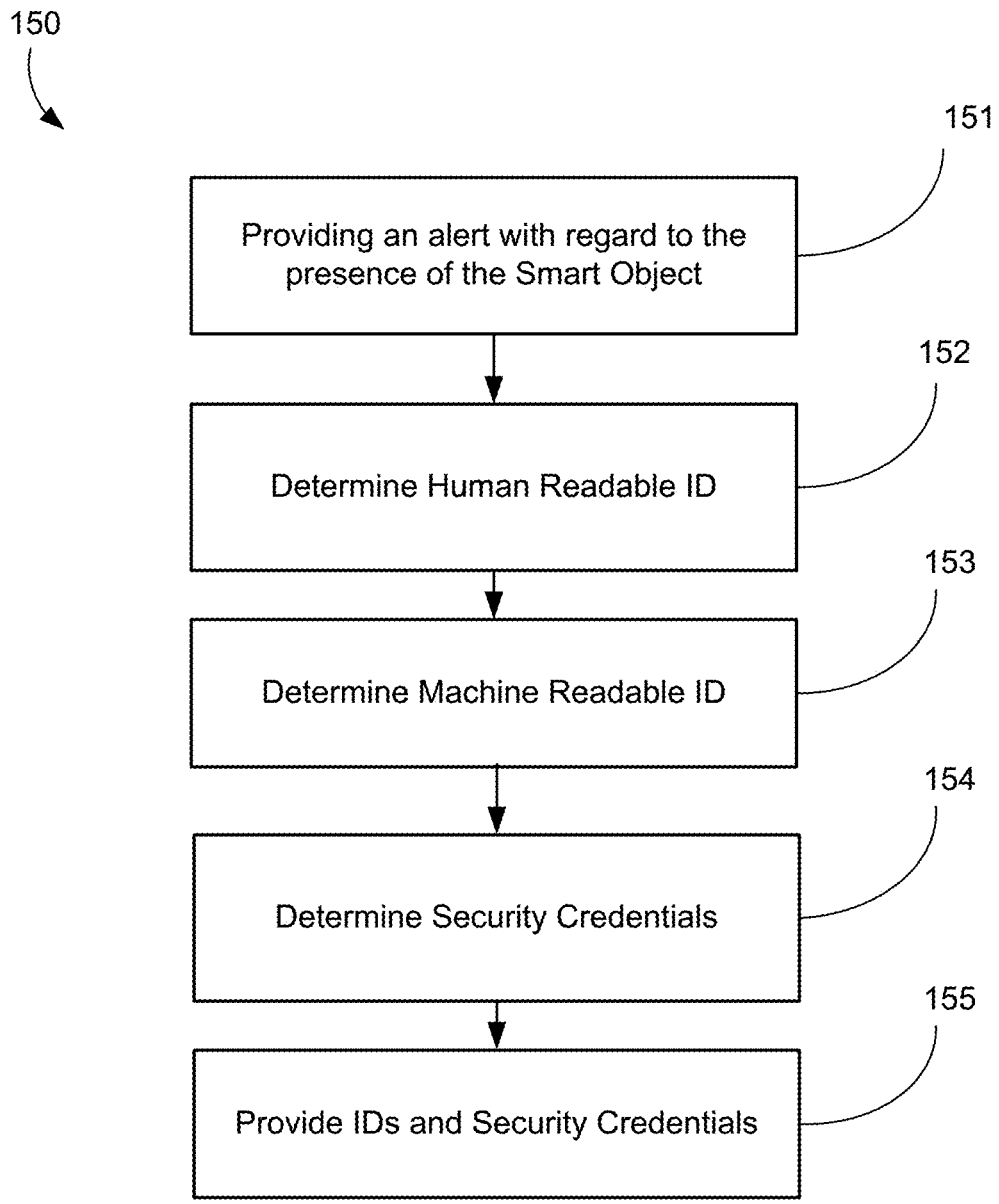
FIG. 4 illustrates an exemplary method for providing an identity and security credentials to a machine-to-machine device.

FIG. 4 illustrates an exemplary method for providing an identity and security credentials to a smart object. At step 151 of FIG. 4, an alert may be received with regard to the presence (e.g., initial detected presence, such as a power on or entering into a M2M communication network) of smart light 102. In a first example, a user may be alerted when smart light 102 initially communicates its presence in the network of digital home 101. The alert may be received on a display of a device, such as a laptop, mobile phone, or other device. The alert may be a pop-up, a text message, or e-mail, among other things.

At step 152, ID may be determined for smart light 102. A user may manually determine the name of smart light 102 to be "dining room light-3." In a second example, a software proxy may receive the alert of step 151 and may automatically determine a name for smart light 102 based on the type of smart light 102 (e.g., desk lamp or overhead lamp), the location of smart light 102, or other factors.

At or before step 152, a naming (ID) convention may be determined for smart light 102. A user may determine whether to manually name smart light 102, have a software proxy automatically name smart light 102, or combination of user and software proxy naming. For example, there may be a naming convention with regard to human readable IDs. The human readable IDs may be a character string based on the type of device (i.e., a new home RD attribute called "device type") and its absolute sequence number in joining digital home 101 (e.g., "low-power-light-5'). A human-readable ID is a representation of data or information that can be naturally read by humans. In computing, human-readable data is often encoded as ASCII or Unicode text, rather than presented in a binary representation. Most data may be parsed by a suitably equipped and programmed computer or machine. Reasons for choosing binary formats over text formats usually center on issues of storage space, as a binary representation usually takes up fewer bytes of storage and efficiency of access (input and output) without parsing or conversion.

At step 153, machine readable IDs may be received or generated for use on the devices in the network. In an example, home RD 106 may associate a human readable ID (for presentation to a user) with a machine readable ID (for protocol uses) of smart light 102. In most contexts, the alternative to a human-readable representation is a machine-readable format of data primarily designed for reading by electronic, mechanical or optical devices, or computers. For example, Universal Product Code (UPC) barcodes are very difficult to read for humans, but are effective with the proper equipment, whereas the strings of numerals that commonly accompany the label are the human-readable form of the barcode information. As discussed herein, machine readable IDs may be a function (i.e., SHA-2 hash) of the date and the time that the smart object joined the network and the human readable character string of the human readable ID.

At step 154, security credential may be determined for the smart object. A user may manually determine the security credentials of smart light 102. In another example, a software proxy may automatically determine security credentials for smart light 102 based on the type of smart light 102, the location of smart light, or other factors. The security credential may be associated with a pre-shared key (e.g., password) or associated with a digital security certificate (e.g., X.509). At step 155, home RD 106 may assign and send (e.g., secured via coaps) the security credentials and the IDs to smart light 102. The security credentials and the IDs of smart light 102 may be based on the determined ID in step 152 or step 153 and the determined security credentials in step 154.

FIG. 5 illustrates an exemplary method for retrieving an identity and security credentials for a smart object. At step 161, smart light 102 may begin initial communications when within range of digital home 101 (e.g., an initial power up). The range of the communications network of digital home 101 may be bound based on wireless power, detected location, or detected physical port of smart light 102, among other things. At step 162, smart light 102 may automatically request an ID and security credentials from any nearby home RD. The request may be made via a broadcast, a multicast, or other message. At step 163, smart light 102 may receive information from home RD 106. Home RD 106 may initially identify itself to smart light 102 and may provide a human readable ID as well as a machine readable ID to smart light 102. In addition, security credentials may be provided to smart light 102. The machine readable ID or human readable ID may be used as the "Title" of any of the URIs of smart light 102 so that the resource is readily identifiable with the given smart light 102. The machine readable ID or human readable ID may be used as part of the security credentials. In the security certificate there may be an identifier for smart light 102 as part of the certificate. <At step 164, smart light 102 may store the received information of step 163 into non-volatile storage. The stored information may be used for future transactions in digital home 101.

Constrained RESTful Environment (CoRE) RD is conventionally used as a resource repository to store Web Links (RFC 5988) for resources hosted on devices. RD conventionally supports a set of REST interfaces for devices to register and publish the set of resources they host and for clients to look up and discover these resources. The following is a list of adjustments to CoRE RD to support the concepts herein for identification and security bootstrapping of devices within digital home 101.

Here is a summary of CoRE RD adjustments to conventional systems. A first adjustment is an additional RD repository to store a pool of available identifiers and security credentials and a corresponding set of additional RD REST interfaces to allow clients to perform operations on the ID or security credential repository such as creating, retrieving, updating, and deleting of IDs and security credentials. A second adjustment may be additional RD REST interfaces to allow RD to query a user or software proxy for approval on whether to allow a smart object to join digital home 101. A third adjustment includes extensions to the conventional RD registration interface to support provisioning devices with IDs and credentials from the RD's ID and security credential repository.

Figure 6:
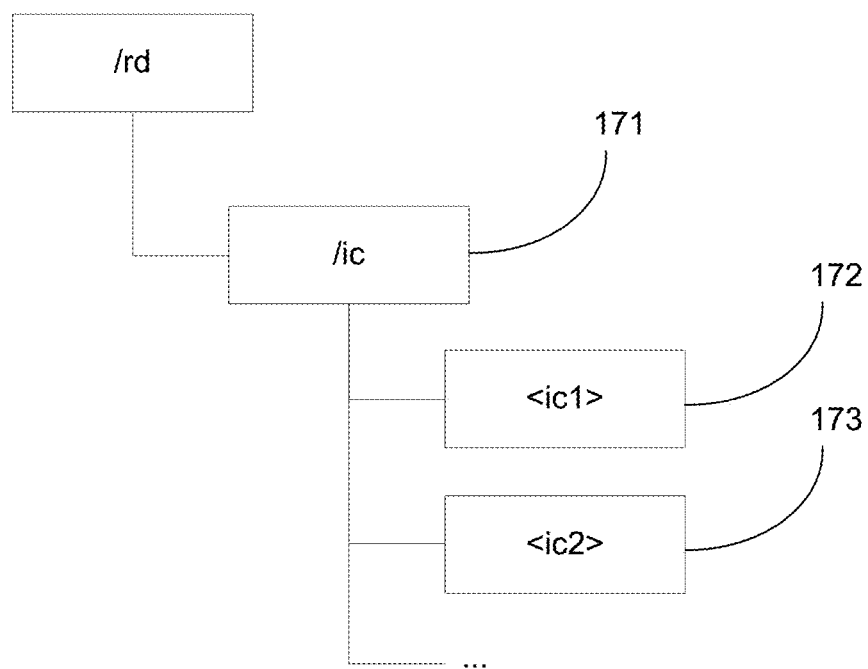
FIG. 6 illustrates an exemplary flow for security credential repository containing individual ID and security credential resources.

One or more repositories for storing available IDs and security credentials may be added to the conventional CoRE RD by defining a set of sub-resources under the conventional /rd resource. An example is shown in FIG. 6 where/ rd/ic 171 is the ID and security credential repository containing individual ID and security credential resources. Within each ID and credential resource, ID and credential information are stored, such as <ic1>172 and <ic2>173. Other examples are possible as well. Also, additional REST interfaces may be added to the set of conventional CoRE RD interfaces to allow clients to perform operations on the ID and security credential repository such as creating, retrieving, updating, and deleting of ID and security credential resources.

Figure 7:
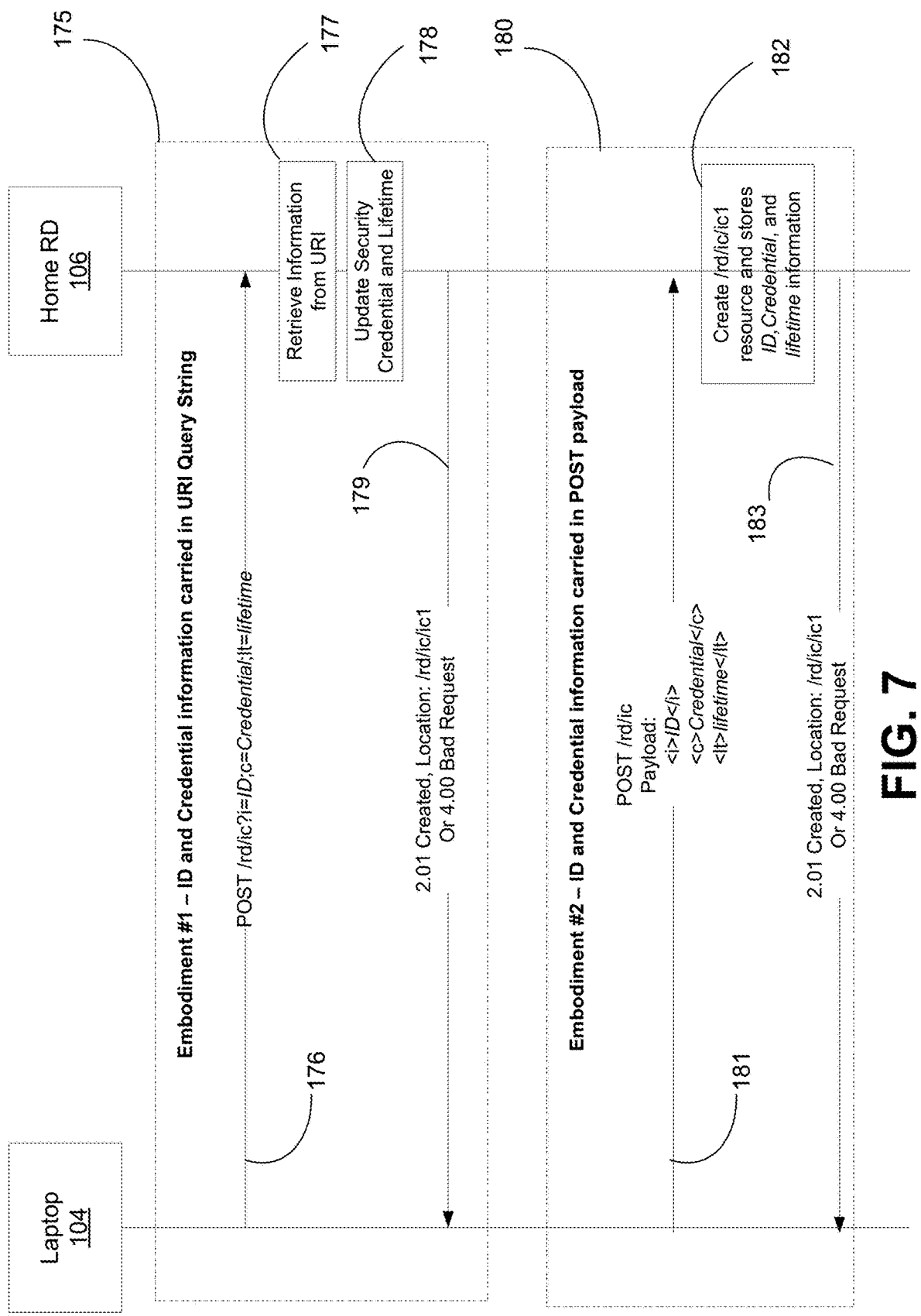
FIG. 7 illustrates an exemplary flow for adding ID and security credential resource to the repository via a registration interface.
Figure 8:
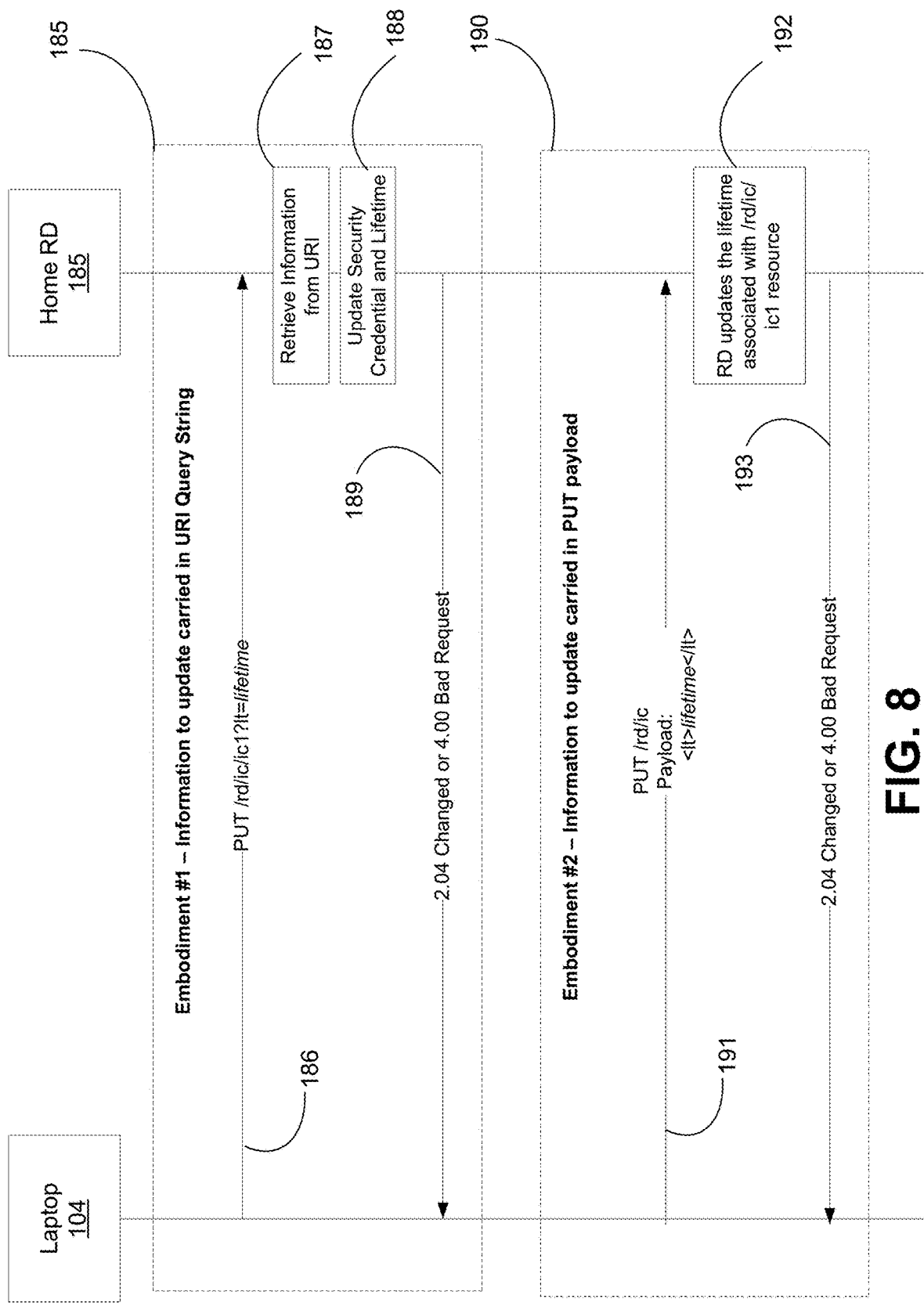
FIG. 8 illustrates exemplary flows for an ID and Credential Update Interface.

It is understood that the entities performing the steps illustrated in FIG. 7 and FIG. 8 are logical entities that may be implemented in the form of software (i.e., computer-executable instructions) stored in a memory of, and executing on a processor of, a device, server, or computer system such as those illustrated in FIG. 10C or FIG. 10D. That is, the method(s) illustrated in FIG. 7 and FIG. 8 may be implemented in the form of software (i.e., computer-executable instructions) stored in a memory of a computing device, such as the device or computer system illustrated in FIG. 10C or FIG. 10D, which computer executable instructions, when executed by a processor of the computing device, perform the steps illustrated in FIG. 7 and FIG. 8.

With reference to FIG. 7, an ID and security credential resource may be added to the repository via a registration interface that accepts a POST request from a user. The POST request may contain ID and security credential information in its message payload (e.g., block 180) or in its uniform resource identifier (URI) query string parameters (e.g., block 175), as shown in FIG. 7. With regard to the URI example of block 175, at step 176, laptop 104 may send a URI to home RD 106. At step 177, home RD 106 may retrieve information from the URI received in step 176. At step 178, home RD 106 may create a resource and store ID, security credential, and lifetime information based on the information retrieved from the URI. At step 179, home RD 106 may send to laptop 104 an acknowledgment of the creation of the resource and a location or an error message. With regard to the payload example of block 180, at step 181, laptop 104 may send a security credential, ID, and lifetime information in a message payload. At step 182, home RD 106 may create a resource and store ID, security credential, and lifetime information based on the information received at step 181. At step 183, home RD 106 may send to laptop 104 an acknowledgment of the creation of the resource and a location or an error message. Before creating or storing resources or credentials home RD 106 may receive and assess information, such as a security key, certificate, ID, lifetime of ID or security credentials, target for type of device ID or security credential, and whether or not authorization is needed from home owner before ID and security credentials can be assigned to a device, among other things.

An ID and Credential Update Interface to the ID and credential repository can be used to refresh or update ID and security credential resource information. FIG. 8 illustrates examples where the lifetime can be extended, or new security keys or certificates can be issued by using a PUT request containing updated ID or security credential information either in the message payload (e.g., block 190) or in URI query string parameters (e.g., block 185). With regard to the URI example of block 185, at step 186, laptop 104 may send a URI to home RD 106. At step 187, home RD 106 may retrieve information from the URI received in step 186. At step 188, home RD 106 may update security credential or lifetime information based on the information retrieved from the URI. At step 189, home RD 106 may send to laptop 104 an acknowledgment of the update at step 188 or an error message. With regard to the payload example of block 190, at step 191, laptop 104 may send an updated security credential or lifetime information in a message payload. At step 192, home RD 106 may update security credential or lifetime information based on the information retrieved at step 191. At step 193, home RD 106 may send to laptop 104 an acknowledgment of the update at step 192 or an error message.

Other interfaces may include an ID and security credential verification/validation interface and an ID and security credential removal interface. An ID and security credential verification/validation interface to the ID and credential repository can be used to verify the validity of security credentials. For example, it may be determined whether or not a certificate is valid. A GET request containing security credentials to validate within URI query string parameters can be used. An ID and security credential removal interface may be used to remove ID and security credentials from the repository. This can be performed using a DELETE operation. Upon removal of ID and credential resources, home RD 106 can also support removal of a corresponding device's resources from the resource repository of home RD 106, which de-registers the device from home RD 106. For example, once an ID and credentials of smart light 102 have been removed from home RD 106, future ID and credential verification/validation requests will result in failure.

Figure 9:
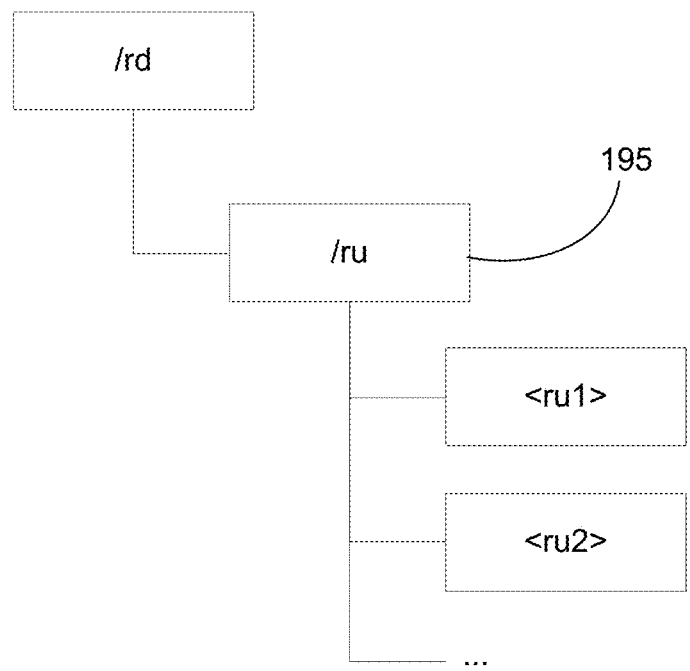
FIG. 9 illustrates an exemplary RD/user interface.

Additional REST interfaces can also be added to the set of existing CoRE RD interfaces to allow home RD 106 to query the user or software proxy for approval on whether to allow a device to join the home network. An example is shown in FIG. 9 where/rd/ru 195 is the RD user interface to the user. Other examples are also possible.

Laptop 104 can use an approval subscription interface to subscribe to home RD 106 in order to receive a query from home RD 106 when devices join digital home 101. A POST operation can be supported on the subscription interface. A POST request from laptop 104 may contain subscription information in the message payload or in URI query string parameters. The subscription information may include contact URI which home RD 106 can send query to, type of devices to receive query about, or specific ID or group of IDs to receive queries about, among other things. A POST response can be used by home RD 106 to indicate whether the subscription operation was successful or not.

Home RD 106 can use an approval query interface to send a query request to laptop 104 (e.g., for a user to view and react) or designated software proxy in order to receive authorization to allow a device to join digital home 101 and optionally to configure smart light 102 with a specified ID or security credentials. A POST operation can be supported on this interface. The POST request can contain notification information in the message payload or in a URI query string parameters. For example, type of devices attempting to register, location of device, etc. A POST response can be used by the user or software proxy to indicate its approval and optionally to configure the smart object with a specific ID or security credentials (for the scenario where home RD 106 is not pre-configured with a pool of IDs and credentials in advance).

CoRE RD supports a registration interface to allow a device to register to a home RD and publish its set of supported resources. This interface may be adjusted to support provisioning a smart object with an ID and security credentials that have either been pre-provisioned into ID and security credential repository of an RD ahead of time before the device registers to the RD or dynamically specified by the user or software proxy at the time of device registration. Upon registration, an ID or security credentials may be passed from home RD 106 to smart light 102 within the POST response message payload. Alternatively, smart light 102 may perform a subsequent GET operation after the POST operation to retrieve its ID and security credentials that have been allocated to it by home RD 106.

Home RD 106 may have different characteristics. A characteristic of the home RD 106 may include being in an "always on" state. In other words, home RD 106 is reachable and responsive to requests from smart objects or a user device, such as laptop 104. Another characteristic of home RD 106 is that it may be a logical node that may be implemented within any computing device. For example, home RD 106 may exist on an IP router, a desktop PC, or a set-top box (e.g., for cable or Internet connections), among other computing devices. The home RD may be located on a stand-alone laptop within the digital home 101 and readily responsive to fulfill its function.

In summary, disclosed herein are methods and systems that provide a way to control smart objects in a localized machine-to-machine network (e.g., home network). A user interface may be provided via a smartphone of a user to allow the user to see a list of smart objects (and some associated status info) in a digital home identified by the assigned names of the smart objects (e.g., "Low-Power-Light-5"). This user interface may be through a web browser or a specialized smart phone App, among other things. A user may view the list of the devices real-time, while in the digital home or outside the digital home. The web browser on a user device (e.g., smart phone) can establish a secure "coaps" link to the Home RD. Alternatively, a secure "https" link may be provided.

The methods and systems for identification and security bootstrapping of a smart object within a digital home environment, as discussed herein, may include one or more of the following: 1) automated assignment of a device level ID and security credential for each smart object in the home using a resource directory (RD) and the CoAP protocol; 2)

a home RD acting as a certificate authority within the digital home to verify assigned digital certificates; 3) a home RD configured with a pool of identifiers and credentials specified by a home owner which in turn can be automatically assigned or provisioned onto smart objects within the home; and 4) a home RD acting as an automated naming software proxy between smart objects that lack a human interface and user that wishes to configure identities and security credentials onto these objects.

FIG. 10A is a diagram of an example machine-to machine (M2M), Internet of Things (IoT), or Web of Things (WoT) communication system 10 in which one or more disclosed examples may be implemented, such as FIG. 1, FIG. 2, or FIG. 3. Generally, M2M technologies provide building blocks for the IoT/WoT, and any M2M device, M2M gateway or M2M service platform may be a component of the IoT/WoT as well as an IoT/WoT service layer, etc.

As shown in FIG. 10A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 10A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Referring to FIG. 10B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Referring also to FIG. 10B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

In some examples, M2M applications 20 and 20' may include desired applications that communicate using smart object (i.e., M2M device) identification processes, as discussed herein. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

FIG. 10C is a system diagram of an example M2M device 30, such as an M2M terminal device 18 or an M2M gateway device 14 for example. As shown in FIG. 10C, the M2M device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with an example. This device may be a device that uses the disclosed systems and methods for smart object identification.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 10C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, the transmit/receive element 36 may be an antenna configured to transmit and/or receive RF signals. The transmit/receive element 36 may support various networks and air interfaces, such as WLAN, WPAN, cellular, and the like. In an example, the transmit/receive element 36 may be an emitter/detector configured to transmit and/or receive IR, UV, or visible light signals, for example. In yet another example, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 10C as a single element, the M2M device 30 may include any number of transmit/receive elements 36. More specifically, the M2M device 30 may employ MIMO technology. Thus, in an example, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other examples, the processor 32 may access information from, and store data in, memory that is not physically located on the M2M device 30, such as on a server or a home computer. The processor 32 may be configured to control lighting patterns, images, or colors on the display or indicators 42 in response to whether the allocation of IDs or credentials (e.g., machine readable IDs) in some of the examples described herein are successful or unsuccessful, or otherwise indicate the status of a smart object (i.e., M2M device). In an example, the ID associated with the smart light 102 may be displayed on display 42 for a user to view and react (e.g., change the ID or touch a screen to turn on a light). If a user wants to turn ON/OFF a smart light 102 via a CoAP web browser interface, then the smart light would be identified by the assigned human readable ID in the web browser interface. Any CoAP messages that would be generated to send to the smart light 102 or home RD 106 may use the machine readable ID.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with an example.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 10D is a block diagram of an exemplary computing system 90 on which, for example, the M2M service platform 22 of FIG. 10A and FIG. 10B may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 or coprocessor 81 may receive, generate, and process data related to the disclosed systems and methods smart object identification, such as receiving CoAP responses.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIG. 10A and FIG. 10B.

It is understood that any or all of the systems, methods and processes described herein may be embodied in the form of computer executable instructions (i.e., program code) stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred examples of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The steps discussed herein (e.g., FIG. 4) do not necessarily need to be completed in the order presented. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. An internet of things (IoT) device, the internet of things comprising:
   a processor; and
   a memory coupled with the processor, the memory having stored thereon executable instructions that when executed by the processor cause the processor to effectuate operations comprising:
      sending a request message to a resource directory server, wherein the request message comprises a request for a persistent identity for the IoT device in a non-volatile storage,
         wherein the request message comprises request to register with the resource directory server, the resource directory server names a plurality of IoT devices, wherein the plurality of IoT devices comprise the IoT device,
      based on the request message to the resource directory server, obtaining a response message,
         wherein the response message comprises an assigned persistent identity of the IoT device by the resource directory, and
         wherein the assigned persistent identity is based on a customized name determination mechanism; and
      sending, based on the response message, the assigned persistent identity of the IoT device to another IoT device or other device.

2. The Io device of claim 1, wherein the response message comprises security credentials for the IoT device.

3. The IoT device of claim 1, wherein the response message comprises security credential for bootstrapping.

4. The IoT device of claim 1, wherein the persistent identity of the IoT device is stored in the non-volatile memory of the IoT device.

5. The IoT device of claim 1, wherein the response message and other messages are received and sent securely using a public key of the resource directory server, wherein the public key was sent as part of a security certificate of the resource directory server.

6. The IoT device of claim 1, wherein the IoT device is a smart light.

7. The IoT device of claim 1, wherein the request message comprises a location of the IoT device.

8. The IoT device of claim 1, wherein the request message comprises a location of the IoT device, wherein the location comprises global positioning system coordinates.

9. The IoT device of claim 1, wherein the request message comprises a location of the IoT device, wherein the location comprises a room location.

10. A method comprising:
sending a request message to a resource directory server, wherein the request message comprises a request for a persistent identity for an internet of things (IoT) device in a non-volatile storage,
wherein the request message comprises request to register with the resource directory server, the resource directory server names a plurality of IoT devices, wherein the plurality of IoT devices comprise the IoT device,
based on the request message to the resource directory server, obtaining a response message,
wherein the response message comprises an assigned persistent identity of the IoT device by the resource directory, and
wherein the assigned persistent identity is based on a customized name determination mechanism; and
sending, based on the response message, the assigned persistent identity of the IoT device to another IoT device or other device.

11. The method of claim 10, wherein the response message comprises security credentials for the IoT device.

12. The method of claim 10, wherein the response message comprises security credential for bootstrapping.

13. The method of claim 10, wherein the persistent identity of the IoT device is stored in the non-volatile memory of the IoT device.

14. The method of claim 10, wherein the resource directory server is a certificate authority that verifies assigned digital certificates.

15. The method of claim 10, wherein the IoT device is a smart light.

16. The method of claim 10, wherein the request message comprises a location of the IoT device.

17. A computer readable storage medium comprising computer executable instructions that when executed by a computing device cause said computing device to effectuate operations comprising:
sending a request message to a resource directory server, wherein the request message comprises a request for a persistent identity for an internet of things (IoT) device in a non-volatile storage,
wherein the request message comprises request to register with the resource directory server, the resource directory server names a plurality of IoT devices, wherein the plurality of IoT devices comprise the IoT device,
based on the request message to the resource directory server, obtaining a response message,
wherein the response message comprises an assigned persistent identity of the IoT device by the resource directory, and
wherein the assigned persistent identity is based on a customized name determination mechanism; and
sending, based on the response message, the assigned persistent identity of the IoT device to another IoT device or other device.

18. The computer readable storage medium of claim 17, wherein the response message comprises security credentials for the IoT device.

19. The computer readable storage medium of claim 17, wherein the response message comprises security credential for bootstrapping.

20. The computer readable storage medium of claim 17, wherein the request message comprises a location of the IoT device, wherein the location comprises room location.

* * * * *